June 9, 1959 — J. E. JACOBS ET AL — 2,890,360
IMAGE INTENSIFICATION
Filed June 29, 1955
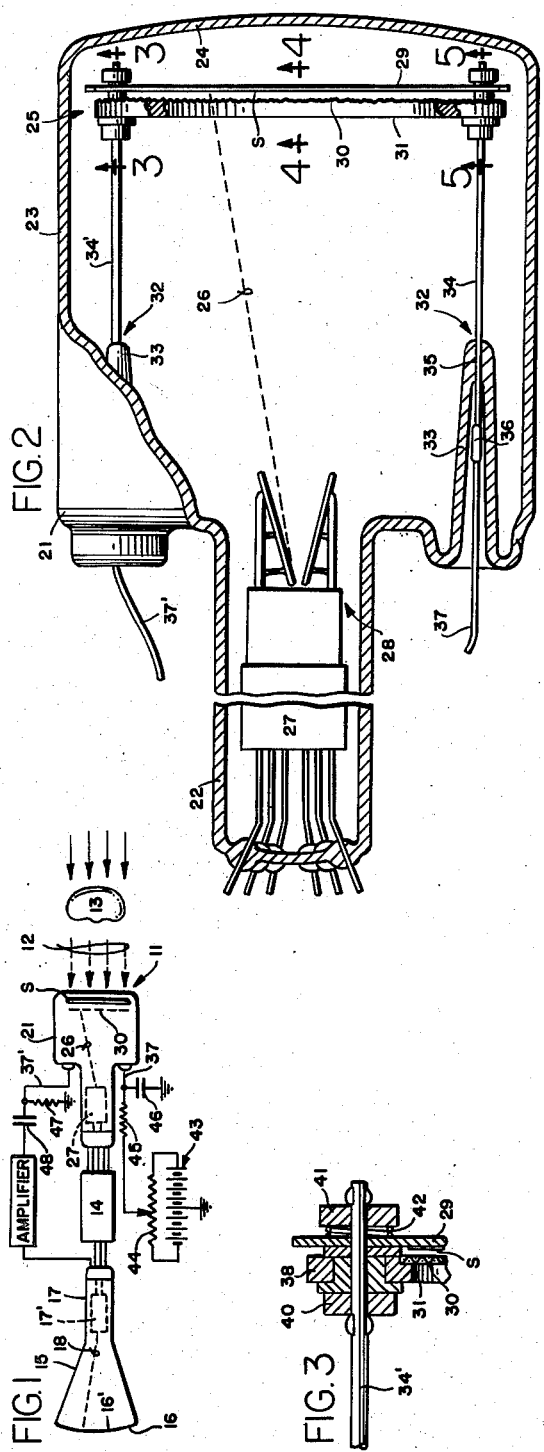
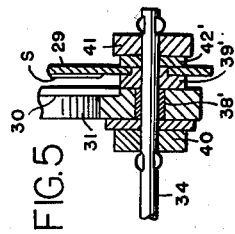
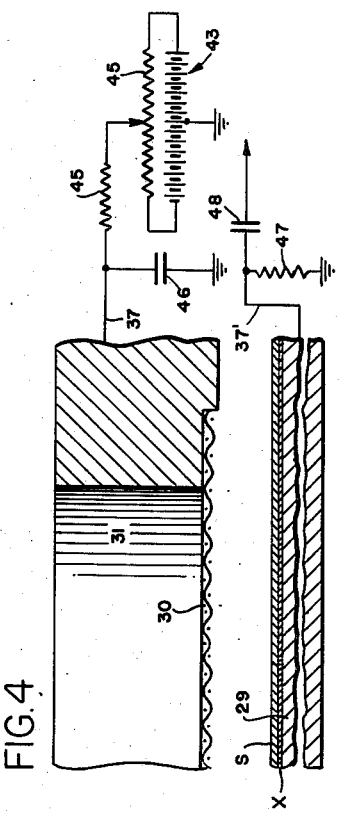
INVENTORS:—
JOHN E. JACOBS
HAROLD BERGER
BY: Junius F. Cook, Jr.
ATTORNEY

United States Patent Office 2,890,360
Patented June 9, 1959

2,890,360
IMAGE INTENSIFICATION

John E. Jacobs, Hales Corners, and Harold Berger, West Allis, Wis., assignors to General Electric Company, a corporation of New York Application June 29, 1955, Serial No. 518,884

8 Claims. (Cl. 313—65)

The present invention relates in general to electronics and has more particular reference to the conversion to optically visible form of latent images carried in penetrating rays such as X-rays, the invention pertaining more especially to improved means for and method of producing intensified electrical impulses corresponding with latent images carried by a beam of penetrating rays whereby to actuate picture reproducing equipment of the sort commonly employed for producing visible television pictures.

A latent invisible picture image of an object may be formed or entrained in a beam of penetrating rays, such as X-rays, gamma rays, or other invisible ray-like emanations of penetrating character, by causing the rays to traverse or scan the object to be pictured. Such a latent ray carried picture image may be reduced to visible form by photographic procedures, as by applying the picture carrying ray beam upon a ray sensitive film, as is common in X-ray photography or radiography. It is also conventional, as in X-ray fluoroscopy, to convert a ray carried latent picture image to visible form by applying the ray directly upon a sensitive screen adapted to glow differentially in proportion to the intensity of ray impingement thereon, and hence to reproduce the latent ray carried image as a visible fluorescent picture on the ray sensitive screen.

The foregoing procedures both involve the application of the ray carrying beam through the object being pictured and directly upon the sensitive film or screen in which the latent ray carried picture is converted to visible form. In order to thus produce a visible picture of satisfactory equality, it is frequently necessary to employ image carrying rays of relatively high intensity representing a hazard to the operator of the picture producing equipment, especially where, as in X-ray fluoroscopy, the resulting visible picture must be viewed from a station closely adjacent the screen. Furthermore, where the object being pictured is a living thing, the required ray quanta for optimum picturing purposes may be of dangerously high value, representing a hazard to the thing being pictured.

An important object of the present invention resides in providing means for and a method of producing visible pictures, corresponding with images latently carried by penetrating rays, such as X-rays, at a remote picturing station to which the image carrying rays may not penetrate, thereby eliminating the hazard of penetrating ray impingement upon the observer of the picture produced at such remote station.

Another important object resides in providing for the direct conversion of penetrating ray energy to electrical energy; a further object being to accomplish such transformation within a thin plate or panel of substantially uniform thickness and comprising a ray sensitive semi-conductor; a further object being to apply latent image carrying rays upon such a plate or panel in order to produce therein a corresponding electrical image defined by differences in the electrical condition of the various portions of the panel; yet another object being to provide for the intensification of the image defining electrical differences in order thus to sharpen the panel carried image; still another object being to accomplish the intensification of an electrically defined image in a ray sensitive panel, in which the same is induced by impingement thereon of a latent image carrying beam of penetrating rays, by providing on said panel an intensifying sheet or layer of material adapted to emit electrons in response to impingement of penetrating image carrying rays on the layer, whereby a ray induced electrical image in said panel may be intensified as a result of impingement on the panel of electrons emitted by the layer through the action of the penetrating rays thereon coincidentally with ray impingement on the panel.

Another important object is to support the energy conversion panel and the intensifying layer in stacked relation upon a suitable support plate of electrical conducting material, whereby latent image carrying rays applied to the conversion panel may be converted to corresponding intensified electrical impulses by progressively scanning the panel as by means of an electron beam of pencil-like character.

Another important object is to produce electrical impulses corresponding with latent ray carried images by applying image carrying rays upon a panel of ray sensitive material having impedance characteristics which fluctuate precisely in accordance with the intensity of image carrying rays impinging thereon, and by providing for the measurement of impedance variations in each integral portion of the layer in terms of electrical current flow therein, whereby to produce electrical impulses corresponding with the degree of ray excitation of the layer, and hence with the latent picture image carried by the layer exciting rays.

Another important object is to provide for electronically scanning the layer with a pencil-like scanning beam of electrons in order thus to measure, progressively and successively, in rapidly repetitive fashion, the momentary impedance characteristics of each integral portion of the layer, to thereby develop electrical impulses, in a circuit associated with the scanning beam and the layer, the impulses so developed representing measurements of the momentary impedance values of the integral portions of the layer, and hence corresponding with the latent image carried by the rays applied to the layer.

Another important object is to bias the layer at a selected potential applied across the layer between a conductive plate carrying the layer and a biasing grid spaced from the plate remote side of the layer, whereby application of image carrying rays on said layer will reduce momentarily the voltage across the layer at the place of ray impingement so that the intensity of said ray may be measured in terms of momentary current flow between said grid and said layer required to restore the potential at said place of ray impingement; a further object being to accomplish potential restoration at a zone of ray impingement in response to the scanning of said zone by a scanning beam cyclically traversing the conversion layer through said biasing screen, to thereby produce voltage fluctuations, in timed relation with respect to the movement of the scanning beam and corresponding with the voltage restorations accomplished in the successively scanned zones of said layer.

Briefly stated, in accordance with one aspect of the invention, a plate of electrical conducting material, such as aluminum, that is substantially transparent to penetrating image carrying rays, such as X-rays, may be mounted at one end of a sealed and evacuated envelope. The inwardly facing surface may carry a relatively thin adherent layer of material, such as lead, gold or caesium, or other material adapted for electron emission in response to excitation by penetrating rays. The inwardly facing surface of the plate may also carry a panel of photosensitive semi-conducting material overlying the electron emission layer so that said panel and layer may be simultaneously exposed to the action of latent image carrying penetrating rays applied thereto through the envelope and the layer supporting, ray transparent plate of electrical conducting material. As a consequence, a latent image comprising differences in the electrical condition of the various portions of the panel may be induced therein. Such electrically defined image will correspond with that latently carried by a panel impinging beam of penetrating rays, such as X-rays. Such electrical image, furthermore, will be intensified by impingement on the panel of electrons emitted from the layer in response to application thereto of the latent image carrying rays.

The invention additionally contemplates means for converting the latent electrical image, induced in the panel of semi-conductive material as the result of penetrating ray impingement thereon, to a form adapted for transmission to a remote receiver and conversion to visual form, as in a picturing tube, the invention, to such end, contemplating the provision in the envelope, as at the end thereof remote from the panel and layer supporting plate, of means for electronically scanning the panel with an electron beam to thereby develop electrical impulses of a sort adapted for transmission as a signal and for the operation of a picturing tube of the sort commonly employed for television picture reproducing purposes.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a diagrammatic view showing apparatus for producing visible images in accordance with the teachings of the present invention;

Fig. 2 is an enlarged sectional view taken through a penetrating ray transducer embodying the present invention and forming part of the apparatus shown in Fig. 1; and Figs. 3, 4 and 5 are sectional views taken substantially along the lines 3—3, 4—4 and 5—5 in Fig. 2.

To illustrate the invention the drawings show picture producing apparatus comprising a penetrating ray transducer adapted to receive penetrating rays 12, such as X-rays, emanating from any suitable ray source and latently carrying the image of an object 13 disposed in the path of the rays 12, between the ray source and the transducer 11. The transducer is adapted to produce electrical impulses corresponding with the characteristics of the image of the object 13 latently carried by the rays 12. The transducer accordingly may be interconnected with a suitable translation system 14 for transmitting electrical impulses to and applying the same for the operation of a picture reproducing tube 15 of the sort commonly employed for television picture producing purposes, whereby the picture reproducing tube 15 may be operated for the reproduction of a visible picture corresponding with the latent picture image carried by the rays 12 and applied to the transducer 11.

The tube 15 may comprise a sealed and evacuated envelope having an enlarged end provided with a wall 16 of transparent material, such as glass, and embodying a picture producing screen 16' of fluorescent material adapted to glow in response to electron impingement thereon, the envelope, remote from and opposite the end wall 16, forming a barrel 17 containing a suitable electron gun structure 17' for generating and applying a pencil-like scanning beam 18 upon the picture producing screen at the wall 16. Associated beam controlling and deflecting means of any suitable or preferred character, including electrostatic deflecting plates within the envelope or focusing and deflecting coils disposed outwardly of the envelope, may be provided for directing the scanning beam 18 to progressively and successively traverse the fluorescent screen, at the end wall 16, in accordance with a selected scanning pattern, to thereby excite the screen to glow differentially in accordance with the fluctuating intensity of the scanning beam. The fluorescent material of the screen on the wall 16 is adapted to glow, at the place of impingement of the beam 18, in accordance with the fluctuating intensity of said beam. The fluorescent screen accordingly will produce a picture visible outwardly of the tube through the transparent end wall 16. The production of such picture is, of course, caused by fluctuating electrical impulses applied to the electron gun 17' for the intensity control of the electron beam 18 in timed relation with respect to the screen scanning movement of the beam. Fluctuating electrical impulses for the intensity control of the electron beam 18 and also for causing the scanning movement of the beam, as shown in Fig. 1, may be delivered through the translation system 14 in accordance with well known television picture reproducing procedures.

In order to develop electrical impulses for the operation of the picture reproducing tube 15 to produce a visible picture corresponding with the latent image carried by the rays 12, the transducer 11, as shown more particularly in Fig. 2, may comprise a sealed and evacuated envelope 21, preferably formed of glass to provide a tubular electron gun housing 22 of limited sectional size, at one end of the envelope, and an enlarged portion 23 forming a scanning chamber in open communication with the gun housing at one end thereof. The envelope 21 may include a preferably outwardly bowed end wall 24 sealing and enclosing the end of the scanning chamber remote from the gun housing. Latent image pick-up means 25 may be provided immediately within the end wall 24 in position disposed in the path of the image carrying rays 12, the pick-up means being also disposed in alinement with the gun housing in position to be scanned by an electron beam 26 emitted by an electron beam gun structure 27 mounted with the housing 22.

The gun structure 27 may be of any suitable, preferred or convenient form and may be used in association with conventional horizontal and vertical electrostatic beam deflection plates 28; or magnetic beam deflecting coils disposed outwardly of the gun housing may be used in conjunction with the gun for beam deflecting purposes, in accordance with well known electron scanning beam operating technique. The image pick-up means 25, as shown, comprises a relatively thin layer or panel of ray sensitive electrical semi-conducting material S, said panel having substantially uniform thickness and being coated upon a suitable support member which may conveniently comprise a plate 29 of electrical conducting material.

For the purpose of the present disclosure, a semi-conductor may be defined as a material having electrical resistance, or reactance, or both, which vary in accordance with the intensity of rays to which the substance is exposed. Electrical resistance and reactance, either inductive or capacitive reactance, or both, are those characteristics of electrical conductors which tend to prevent the flow of electrical current therethrough under the influence of an electromotive force. The combined flow resistive effect of resistance and reactance in the conductor material is commonly referred to as the electrical impedance of the material.

In the absence of rays to which it is responsive, a semi-conductor may have impedance characteristics of such high order as to constitute the material as a virtual insulator capable of substantially preventing the flow of electrical current therethrough. When irradiated with rays to which it is responsive, the impedance of the semi-conductor material may be reduced as a proportional function of incident ray intensity, so that the material becomes electrically conducting in proportion to the intensity of exciting rays impinging thereon. As a consequence, such ray induced or controlled change in the impedance of the semi-conductor may be measured to determine the intensity of rays impinging on the semi-conductor.

In accordance with the present invention, the ray sensitive material forming the panel or layer S preferably comprises lead oxide. Other crystalline semi-conductor material, such as cadmium sulphide or the combined sulphides of zinc and cadmium, may be employed. Irradiation of the panel S by penetrating rays 12 carrying the latent image of the object 13 will correspondingly alter the impedance of the crystalline semi-conductor material of the panel and thus apply a latent image of the object in the panel S, said latent image being defined in terms of the variation in the impedance characteristics of each integral portion of the panel.

In order to attach the panel S upon the support plate 29 and to intensify the electrical ray induced image in the panel, a relatively thin intermediate layer X of material, such as lead, gold, caesium or other suitable material, adapted to emit electrons in response to ray excitation thereof, is interposed between the support plate 29 and the panel of semi-conductor material S. To this end the material of the layer X may be applied on the inwardly facing surface of the plate 29, as by the evaporation of lead upon the plate to a depth or thickness of the order of 5 microns. The material of the panel S may then be applied upon the layer X to a thickness of the order of 150 microns. The material of the layer X not only is capable of emitting electrons when excited by penetrating ray impingement thereon for the intensification of the ray induced image in the panel S, but also serves to accommodate the difference in the thermal expansion coefficients of the aluminum plate 29 and the lead oxide panel S, thereby tending to prevent peeling of the panel material from the support plate. The desirability of providing such dual functions in the layer X imposes a limitation upon materials that are usable for the accomplishment of such functions. Heavy materials, such as gold and lead, are preferable over the more conventional lightweight photoemissive materials, such as caesium and its compounds.

The present invention also contemplates means for successively and repetitively measuring the ray determined impedance of each integral portion of the panel S in order to produce a transmissible signal corresponding with the impedance defined latent image in the panel S. To that end, the pick-up means 25, in addition to the panel S and its supporting plate 29, may comprise a foraminous screen 30 mounted in closely spaced relationship with respect to the plate 29 in position overlying the surface thereof which carries the panel S.

The plate 29 may conveniently comprise a flat relatively thin sheet of aluminum, copper, or other preferred electrical conducting material capable of supporting the layer X and panel S, while the foraminous screen 30 may comprise a sheet of fine mesh woven metal wire fabric, of the order of sixty meshes per lineal inch, the plate 29 and screen 30 being electrically insulated the one from the other, and being supported in spaced apart relation of the order of one-eighth inch. To this end, the foraminous screen 30 may be tautly stretched and secured upon a frame 31, the marginal edges of the screen 30 being electrically and mechanically secured on the frame 31, as by means of solder. Pedestal means 32 may be provided for supporting the frame 31 and the plate 29 within the envelope 21. The pedestal means 32 may comprise re-entrant envelope portions 33 carrying stems 34 of electrical conducting material forming glass-metal seals 35 with said re-entrant portions 33, the stems 34 having portions extending within the enlarged envelope portion 23, adjacent the end wall 24 of the envelope, and portions extending outwardly of the envelope through the re-entrant portions 33, said outwardly extending portions being electrically connected, as at 36, with preferably flexible conductors 37. The frame 31 and the foraminous screen 30 supported thereon, as well as the plate 29, may be mounted upon the stems 34 in manner presenting the plate 29 and screen 30 immediately inwardly of the end wall 24 of the envelope, in position centered with respect to the electron gun structure 27, the foraminous screen 30 being disposed in parallel spaced relation with respect to the plate 29 and between said plate 29 and the electron gun structure.

As shown more especially in Figs. 3 and 5, the plate 29 and the frame 31 may be mounted upon the stems 34 in fashion electrically connecting the plate with one of the stems, while electrically connecting the frame 31 and the foraminous screen 30 carried thereby with another of said stems 34. Accordingly, as shown in Fig. 3, one of the stems 34 may carry an insulating collar 38 adapted to fit within and extend through an opening formed in the frame 31. The stem may also carry an insulating washer 39 extending on the stem, between the frame 31 and the plate 29, which is also formed with an opening therethrough for receiving the stem 34. The plate 29, frame 31, and insulating members 38 and 39 may be secured on the stem 34 by and between suitable clamping members 40 and 41, a washer 42 of electrical conducting material being disposed between the plate 29 and the clamping member 41.

The structure shown in Fig. 3 thus mechanically mounts the plate 29 and foraminous screen 30 on the stem 34, and electrically connects the plate with the stem, while insulating the screen 30 and its supporting frame 31 from the plate and the supporting stem.

As shown in Fig. 5, one of the stems 34 may carry a mounting collar 38' of electrical conducting material adapted to snugly fit within an opening formed through the frame 31, in order to electrically connect the frame with the stem. The stem may also carry an insulating collar 39' having a portion adapted to extend through an opening formed in the plate 29 in order to space and insulate the plate from the frame 31, and to insulate the plate from the stem. The plate 29, frame 31, and the members 38' and 39' may be secured on the stem 34 by and between suitable clamping members 40 and 41, an insulating washer 42' being disposed between the plate 29 and the clamping member 41.

The structure shown in Fig. 5 thus mechanically mounts the plate 29 and foraminous screen 30 on the stem 34, and electrically connects the foraminous screen with the stem, while insulating the plate 29 from the foraminous screen and the supporting stem.

When the transducer is in operation, a potential difference of desired value, supplied from a suitable unidirectional power source 43, may be maintained between the plate 29 and the foraminous mesh screen 30. To this end, the power source 43 may be medially connected to ground, the positive and negative ends of the source being connected across a potentiometer forming resistor 44, having an associated adjustable tap connected with the mesh screen 30, as through the conductor 37, then preferably through a resistor 45. By adjusting the tap of the potentiometer any desired positive or negative voltage with respect to ground, within the range of voltage afforded by the source 43, may be applied to the mesh screen 30. If desired, the mesh screen may be connected to ground through a condenser 46. The plate 29 may be connected to ground, as by way of the conductor 37' and an output resistor 47.

When the panel S is dark, that is to say when it is not being irradiated by rays to which it is sensitively responsive, the voltage drop across the panel, when the same is scanned, will be merely the relatively small dark current loss characteristic of the semi-conductor material of which the panel S is formed. When the panel is irradiated by rays 12 to which it is sensitive, the voltage drop across the panel, at the scanning spot, will be directly proportional to the intensity of layer rays impinging at the scanning spot. Such loss is instantly restored by the power source 43, since the scanning beam functions as a conduction path between the foraminous screen 30 and the facing surface of the panel S. The extent of such restoration may be measured in terms of voltage across the output resistor 47. Voltage thus developed across the resistor 47 will accurately define the latent image imposed by exciting rays 12 in the panel S, and consequently means may be provided for controlling the operation of the picture tube 15 in accordance with the voltage developed across the resistor 47, as by applying said voltage through a condenser 48 to any preferred amplifying system 49, for application on the control grid of the electron gun of the viewing tube, to thereby control the picture reproducing intensity of the electron beam 18.

It will be seen from the foregoing that the present invention in its broader aspect contemplates the direct conversion of X-ray energy to corresponding electrical impulses directly in the semi-conductive panel S. When the panel S is scanned by the electron beam, the variations in energy absorbed by the layer from the beam, in order to restore ray induced energy losses in the layer, are used to measure and hence indicate the X-ray pattern applied to the panel S.

Alteration or adjustment of the operating potential applied on the foraminous screen 30 may be utilized to control the rate of response of the transducer to variations in the intensity of the exciting rays 12. If, for example, the device be operated at a positive potential of the order of fifty volts, the image response is substantially instantaneous, that is to say, the panel S retains substantially no electrical evidence of an image following the scanning of the layer by the beam 26. If, however, the positive potential applied on the foraminous screen 30 be raised to a value of the order of two hundred to three hundred volts, the latent image imposed in the panel S, at the instant when the potential is thus raised, is effectively locked in the panel and may be detected by electronically scanning the panel for extended periods, of the order of several minutes, before the so locked image fades out to an extent such that it can no longer be detected. The latent image, which at the instant of locking is present in the panel, in the form of unneutralized positive charges distributed throughout the panel, becomes locked in the panel in the form of electron deficiencies, throughout the panel, so that continued scanning will continue to show the latent image. Neither continuation nor elimination of the impingement of layer exciting rays 12 affects the intensity of a latent image so locked in the panel S by a sudden increase in positive mesh potential.

When a system of the sort described is employed for X-ray fluoroscopy, the equipment may normally be operated under low positive voltage excitation of the foraminous screen 30, in order that there will be substantially no image retention in the panel S. Whenever the fluoroscopic examination reveals a condition of unusual interest in the observed image of an examination object, the said image may instantly be locked in the panel S and scanned to apply a visible reproduction thereof on the screen of the viewing tube 15, and said visible reproduction of the so locked image may then be photographed for permanent record purposes, or may be studied during the extended interval within which the locked image gradually fades. Obviously the apparatus of the present invention may be employed to eliminate conventional X-ray film and darkroom practice in connection with radiography.

Apparatus embodying the present invention also may be utilized in place of so-called spot film devices, of the sort described, for example, in Letters Patent of the United States No. 2,552,858, issued May 15, 1951, on the invention of Robert J. Mueller and Ivan Burgeson in Serialographic Apparatus. For such service, X-ray fluoroscopy may be conducted by adjusting the pick-up tube or transducer 11 for fast response. When a condition in the examination object is observed upon the screen of the viewing tube 15, of which a permanent record is desired, the image may be locked in the panel S and X-radiation immediately discontinued. The locked image may then be reproduced on the screen of the viewing tube, and there photographed. For such service, the present invention provides manifest advantages, in that the patient need not be exposed to additional radiation in order to obtain a desired picture. Furthermore, there is no delay between observation of a condition requiring photographic recordation and the locking of the image for photography in due course and at leisure. Moreover, the present invention eliminates all mechanical problems associated with the projection and retraction of film carrying cassettes into picture making position in spot film apparatus of the sort illustrated and described in Letters Patent of the United States No. 2,552,858.

It has been determined that the power to retain a ray induced image varies as a characteristic of the particular ray sensitive semi-conductor material employed in the panel S. Where a semi-conductor material such as cadmium sulphide, containing copper as an activator, is employed, the image response is relatively slow; indeed, where copper is employed as an activating medium, even when the device is operated at voltages in the foraminous screen 30 such that image persistence is at a minimum, the persistence of the ray induced image in the panel S is such that the device is of little use for the observation of moving objects. The image locked in photoconductors of this type, either because of the inherent slow response characteristic of the photoconductor, or by positive potential increase on the screen 30 of a device embodying fast image response ray sensitive material, may be rapidly wiped out of a sensitive panel S containing the same by momentarily reducing the potential on the foraminous screen 30 to a negative value, of the order of several hundred volts. Such voltage reduction may be accomplished at relatively high frequency and automatically by employing a control wave of square form, which may be derived from the vertical scan synchronizing generator. By thus providing for applying image wipe-off negative voltage periodically upon the screen 30 at relatively high frequency, the effective results of a layer having fast response characteristics may be obtained even where the layer comprises material having substantially slow image characteristics.

A transducer 11 embodying a ray sensitive panel S, of the persistent image or slow image response type, may be applied to great advantage in the radiography of stationary objects. The image storing ability of the slow response material allows substantial reduction in the intensity of picturing rays, for the reason that the sensitive material has a cumulative action under ray impingement, similar to that possessed by photographic film under the influence of light; and the image erasing feature is, of course, of considerable advantage in that it allows the panel S, in effect, to be wiped clean of an image, as soon as the same is no longer wanted.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A penetrating ray transducer comprising a panel consisting of lead oxide, as a ray sensitive semi-conductor material, adapted to be interposed in the path of penetrating rays whereby to alter the electrical characteristics of the various integral portions of the panel in accordance with the intensity of rays impinging thereon, and a layer of ray sensitive electron emitting material overlying a surface of said panel in position exposed to the action of panel impinging rays, whereby to intensify the ray induced alteration of the electrical characteristics of the panel by the action of layer emitted electrons on the material of said panel.

2. A penetrating ray transducer as set forth in claim 1, including a support plate of electrical conducting material, said layer of electron emitting material and said panel of lead oxide being supported in stacked relation on said plate.

3. A penetrating ray transducer as set forth in claim 1, including a support plate of electrical conducting material, said layer of electron emitting material overlying and having superficial contact with a surface of said plate, said panel overlying and having superficial contact with the plate remote side of said layer.

4. A penetrating ray transducer as set forth in claim 1, including a support plate of electrical conducting material selected from the class consisting of aluminum and copper, said layer of electron emitting material and said panel of lead oxide being supported in stacked relation on said plate.

5. A penetrating ray transducer comprising a panel consisting of lead oxide, as a ray sensitive semi-conductor material, adapted to be interposed in the path of penetrating rays whereby to alter the electrical characteristics of the various integral portions of the panel in accordance with the intensity of rays impinging thereon, and a layer of ray sensitive electron emitting material selected from the heavy metal class consisting of lead and gold, said layer overlying a surface of said panel in position exposed to the action of panel impinging rays, whereby to intensify the ray induced alteration of the electrical characteristics of the panel by the action of layer emitted electrons on the material of said panel.

6. A penetrating ray transducer comprising a panel of ray sensitive semi-conductor material selected from the class consisting of lead oxide and the sulphides of cadium, mercury and zinc, and adapted to be interposed in the path of penetrating rays whereby to alter the electrical characteristics of the various integral portions of the panel in accordance with the intensity of rays impinging thereon, and a layer of ray sensitive electron emitting material comprising caesium overlying a surface of said panel in position exposed to the action of panel impinging rays, whereby to intensify the ray induced alteration of the electrical characteristics of the panel by the action of layer emitted electrons on the material of said panel.

7. A penetrating ray transducer comprising a support plate of electrical conducting material that is relatively transparent to penetrating rays to be transduced, a panel of ray sensitive semi-conductor material supported on said plate in overlying relationship with respect to its back surface in position to be exposed to the action of penetrating rays applied to the front surface of said plate and delivered therethrough upon the material of said plate, and a layer of ray sensitive electron emitting material interposed between and in contact with the facing surfaces of said support plate and panel, whereby to intensify the ray induced alteration of the electrical characteristics of the panel by the action of layer emitted electrons upon the material of said panel, said interposed layer comprising material coated upon a surface of the support plate to a thickness of the order of five microns, the panel comprising material selected from the class consisting of lead oxides and the sulphides of cadmium, mercury and zinc covering the layer to a depth of the order of 150 microns.

8. A penetrating ray transducer comprising a support plate of electrical conducting material that is relatively transparent to penetrating rays to be transduced, a panel of ray sensitive semi-conductor material supported on said plate in overlying relationship with respect to its back surface in position to be exposed to the action of penetrating rays applied to the front surface of said plate and delivered therethrough upon the material of said plate, and a layer of ray sensitive electron emitting material interposed between and in contact with the facing surfaces of said support plate and panel, whereby to intensify the ray induced alteration of the electrical characteristics of the panel by the action of layer emitted electrons upon the material of said panel, said layer comprising a relatively heavy metal selected from the class consisting of gold and lead and coated upon the back surface of the support plate to a depth of the order of five microns, the panel comprising lead oxide applied upon the support plate in position overlying said layer to a depth of the order of 150 microns.

References Cited in the file of this patent

UNITED STATES PATENTS

| | | |
|---|---|---|
| 2,525,832 | Sheldon | Oct. 17, 1950 |
| 2,666,856 | Fua et al. | Jan. 19, 1954 |
| 2,699,512 | Sheldon | Jan. 11, 1955 |